(12) United States Patent
Wei et al.

(10) Patent No.: US 10,387,024 B2
(45) Date of Patent: Aug. 20, 2019

(54) INTERACTIVE ANALYSIS OF DATA BASED ON PROGRESSIVE VISUALIZATIONS

(71) Applicant: Hewlett-Packard Development Company, L.P., Houston, TX (US)

(72) Inventors: Jishang Wei, Palo Alto, CA (US); Jinrong Xie, Davis, CA (US); Arun Kumar Paruchuri, Palo Alto, CA (US); Nelson L. Chang, San Jose, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/518,459

(22) PCT Filed: Mar. 30, 2015

(86) PCT No.: PCT/US2015/023357
§ 371 (c)(1),
(2) Date: Apr. 11, 2017

(87) PCT Pub. No.: WO2016/159957
PCT Pub. Date: Oct. 6, 2016

(65) Prior Publication Data
US 2017/0336954 A1  Nov. 23, 2017

(51) Int. Cl.
*G06T 3/40* (2006.01)
*G06F 16/28* (2019.01)
(Continued)

(52) U.S. Cl.
CPC ...... *G06F 3/04847* (2013.01); *G06F 3/04845* (2013.01); *G06F 16/904* (2019.01);
(Continued)

(58) Field of Classification Search
CPC . G06T 19/00; G06T 11/60; G06T 3/40; G06T 11/206; G06T 17/20; G06T 3/4053;
(Continued)

(56) References Cited

U.S. PATENT DOCUMENTS 7,038,680 B2   5/2006  Pitkow
7,996,786 B2   8/2011  MacLaurin et al.
(Continued)

OTHER PUBLICATIONS

C.D. Stolper et al, "Progressive Visual Analytics: User-Driven Visual Exploration of In-Progress Analytics", IEEE TVCG, 20(12), 2014 ~ 10 pages.
(Continued)

*Primary Examiner* — Ke Xiao
*Assistant Examiner* — Andrew Shin
(74) *Attorney, Agent, or Firm* — HPI Patent Department

(57) ABSTRACT

Interactive analysis of data based on progressive visualizations is disclosed. One example is a system including a data module, a visualization module, an interaction module, and an analytics module. The data module processes a plurality of data elements. The visualization module progressively displays, via an interactive graphical user interface, an overview visualization of a sub-plurality of the plurality of data elements, the overview visualization based on at least one of data resolution and display resolution, and a detailed visualization based on an interaction with the overview visualization. The interaction module processes the interaction with the overview visualization. The analytics module analyzes the interaction to generate a deployment rule.

19 Claims, 13 Drawing Sheets

(51) Int. Cl.
*G06F 16/35* (2019.01)
*G06F 3/0484* (2013.01)
*G06F 16/904* (2019.01)
*G06T 11/20* (2006.01)
*G06K 9/62* (2006.01)

(52) U.S. Cl.
CPC .......... *G06K 9/6253* (2013.01); *G06T 11/206* (2013.01); *G06F 2203/04806* (2013.01); *G06T 2200/24* (2013.01)

(58) Field of Classification Search
CPC . G06T 3/4076; G06T 2210/36; G06T 3/4092; G06T 2207/20016; G09G 2340/0407; G06F 3/0481; G06F 16/285; G06F 16/287; G06F 16/34; G06F 16/35; G06F 16/355; G06F 16/358
USPC ................ 345/419, 619, 660, 661, 666, 440
See application file for complete search history.

(56) References Cited

U.S. PATENT DOCUMENTS

2004/0183800 A1* 9/2004 Peterson ............... G06T 11/206
345/440
2007/0171716 A1* 7/2007 Wright .................. G06T 11/206
365/185.12
2009/0273602 A1 11/2009 Wong et al.
2014/0075327 A1 3/2014 Noel et al.
2014/0168230 A1 6/2014 Nienhaus et al.
2015/0012502 A1 1/2015 Sensharma

OTHER PUBLICATIONS

Hanrahan, Pat, et al., "Selecting a Visual Analytics Application," Tableau Software Inc., 2012, https://www.tableau.com/sites/default/files/whitepaper/ ~ 11 pages.
Heer, J. et al. ;"Interactive Analysis of Big Data"; Sep. 2012; http://xrds.acm.org/article ~ 5 pages.
Heinrich, J. et al.;"Progressive Splatting of Continuous Scatterplots and Parallel Coordinates"; Apr. 6, 2011; http://www.vis.uni-stuttgart.de/ ~ 10 pages.
J.F. Im et al, "Visreduce: Fast and Responsive Incremental Information Visualization of Large Datasets", 2013 ~ 8 pages.
Liu, Z et al, "imMens: Real-time Visual Quering of Big Data" Proceedings of EuroVis, 2013 ~ 10 pages.
Schretlen, P. et al.: Interactive Data Exploration with "Big Data Tukey Plots": Dec. 15, 2013; http://www.oculusinfo.com/ ~ 2 pages.

* cited by examiner

INTERACTIVE ANALYSIS OF DATA BASED ON PROGRESSIVE VISUALIZATIONS

BACKGROUND

Big data applications, such as recommendation systems, predictive modeling, and pattern recognition, often rely on data visualizations, including visualizations of high-dimensional data. Large volumes of data may be stored on different machines from where data visualizations are generated.

DETAILED DESCRIPTION

Figure 1:
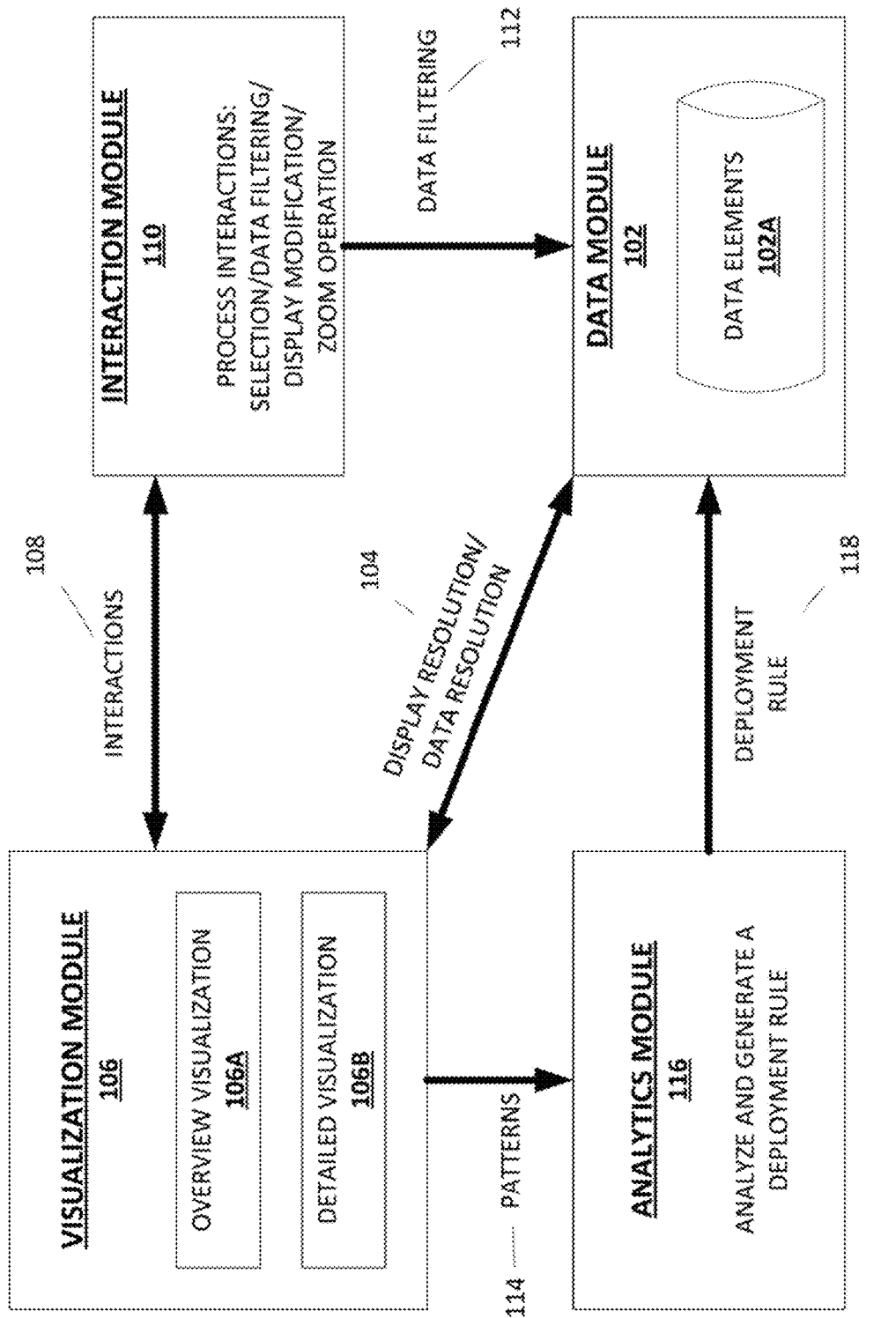
FIG. 1 is a functional block diagram illustrating one example of a system for interactive analysis based on progressive visualizations.

An important task for many big data applications such as in recommendation systems, predictive modeling, and pattern recognition, is a search for event patterns. Large volumes of data place challenges on generating visualizations, supporting real-time interactions, and/or summarizing valuable insights. Such challenges may be especially significant when large volumes of data are stored on different machines, possibly located in different geographical locations, from where the data visualizations may be generated.

Existing data visualization techniques generally load all data elements in a database to generate full-resolution visualizations. Users may typically interact with the visualization only after all the data elements are loaded and presented in visual form. Existing visualization techniques include real-time, interactive visual querying of a large volume of data, based on multivariate data tiles and parallel query processing. However, the data tiles are generally prepared and loaded into a computer memory before a visualization may be generated. As a result, users are generally unable to visualize data and discover insights directly from a data repository.

Existing visualization techniques also include incremental visualizations based on a combination of a MapReduce-style algorithm and a compressed columnar data store to generate common visualizations, such as scatterplots and heat maps. However, such techniques do not support real-time interactions, such as zoom operations and data filtering.

Also, for example, existing visualization techniques include progressive visual analytics methods that display constantly refined analysis results and allow analysts to interact with, and guide, the analysis algorithm while the analysis is being performed. However, such methods are generally directed to progressive analytics algorithms, instead of generating flexible visualizations that adaptively focus on the underlying data that the analytics algorithms are based on.

Generally, existing techniques may not provide on-demand visualizations based on display resolution and data resolution, a user's intentions for exploring data, and/or real-time interactions that generate deployment rules for automatic data analytics. For example, existing techniques may not enable discovery of data analytics guided by deployment rules that may be automatically generated based on interactions with visualizations. Also, for example, existing techniques generally may not enable visualization of data, and discovery of insights, directly from a data repository.

The interactive approach described herein is based on a visual analytics workflow design that enables rapid visualizations of large volumes of data, flexibility in regenerating progressive visualizations, and a fully interactive interface to discover new patterns. Unlike existing visualization techniques that depend on loading the entire data from the database and generate full-resolution visualizations, the disclosed approach produces on-demand visualizations based on display resolution and size, users' data exploration intentions, and visual perception abilities of a user. Such an approach enables fast visualization generation for large-scale data. The term "large-scale", as used herein, refers to a large volume of high-dimensional data, and/or data from spatially distributed data sources. High-dimensional generally refers to data elements that have a plurality of attributes. For example, if a data element is represented in vector form, then a high-dimensional data element is a vector with more than one component. As used herein, data can be representative of any type of data, including healthcare data, retail data, security data, and so forth.

Although examples described herein are based on scatterplots to visualize a large volume of high-dimensional data, the visualization rendering strategies, such as adaptive rendering, progressive visualization, responsive visualization generation, and rapid discovery to deployment, may be broadly extended and applied to other types of big data visualization techniques as well.

As described herein, an overview visualization with partial data elements may be progressively rendered, and a detailed visualization may be subsequently rendered based on interactions with the overview visualization. At any time during the rendering, a user may change visualization views (e.g., redefining a mapping between data dimensions and scatterplot axes), or filter out data (e.g., removing data points within a value range along one dimension). Once interesting patterns are detected, the user may select the detected patterns, investigate the patterns further using advanced analysis methods, and generate deployment rules to define such detected patterns. The deployment rules may be utilized to automatically generate future patterns, and/or guide data analytics.

As described in various examples herein, an interactive analysis based on progressive visualizations is disclosed. One example is a system including a data module, a visualization module, an interaction module, and an analytics module. The data module processes a plurality of data elements. The visualization module progressively displays, via an interactive graphical user interface, a data visualization including an overview visualization of a sub-plurality of the plurality of data elements, the overview visualization based on at least one of data resolution and display resolution, and a detailed visualization based on an interaction with the overview visualization. The interaction module processes the interaction with the overview visualization. The analytics module analyzes the interaction to generate a deployment rule.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

FIG. 1 is a functional block diagram illustrating one example of a system 100 for interactive analysis based on progressive visualizations. System 100 is shown to include a data module 102, a visualization module 106, an interaction module 110, and an analytics module 116.

The term "system" may be used to refer to a single computing device or multiple computing devices that communicate with each other (e.g. via a network) and operate together to provide a unified service. In some examples, the components of system 100 may communicate with one another over a network. As described herein, the network may be any wired or wireless network, and may include any number of hubs, routers, switches, cell towers, and so forth. Such a network may be, for example, part of a cellular network, part of the internet, part of an intranet, and/or any other type of network.

System 100 includes a data module 102 to process a plurality of data elements 102A. Generally, the plurality of data elements 102A describe contents of a large dataset. Although the examples described herein are with reference to high-dimensional data, the techniques disclosed herein may apply to other types of data as well. In some examples, the plurality of data elements 102A may be contents of a cyber-security dataset with over 500 million records, each record having about 261 data attributes or data features. In some examples, the data features may include time, destination port number ("dpt"), source port number ("spt"), "log message", "IP address", and so forth. In some examples, the data features may include derived data features, such as anomaly scores, duster patterns, distance from a norm of a distribution, entropy values for data attributes, and so forth. In some examples, the plurality of data elements 102A may be representative of a nutrient database that may include 8500 different data objects, each data object corresponding to a food item, and 50 different numerical components or attributes associated with each of the 8500 food items. In some examples, the plurality of data elements 102A may be representative of customer transactions, Web navigation logs (e.g. click stream), security logs, and/or DNA sequences. In some examples, the plurality of data elements 102A may be representative of a high-dimensional dataset of patients.

In some examples, the plurality of data elements 102A may be included in a single database. In some examples, the plurality of data elements 102A may be included in multiple databases, optionally located in multiple geographical areas. As described herein, interactive visualizations may be provided for rapid analysis, including instances where the plurality of data elements 102A are in multiple databases, optionally located in multiple geographical areas.

In some examples, the data module 102 may access the plurality of data elements 102A from a public database, such as a database from a Food and Drug Safety organization, Centers for Disease Control, and so forth. In some examples, the data module 102 may access the plurality of data elements 102A from a secured database such as a cyber-security database, a patients' database from a hospital, and so forth. In some examples, the data module 102 may access the plurality of data elements 102A from the internet.

In some examples, data resolution may exceed display resolution. Data resolution refers to size of input data. For example, the plurality of data elements 102A may number in hundreds of millions, with each data element having hundreds of attributes (or components, or dimensions). Such a large volume of data may need to be displayed on a visualization screen. Display resolution generally refers to screen resolution. For example, the display resolution may be based on screen sizes ranging from 800×600 to 1600× 900. Display resolution may also depend on screen orientation, such as, for example, landscape, portrait, and so forth. Display resolution may also depend on a type of visualization, such as, for example, a two-dimensional display, or a three-dimensional display, and so forth.

In some examples, the data module 102 may receive information related to the display resolution from the visualization module 106. Based at least in part on such information, the data module 102 may aggregate the plurality of data elements 102 for a data visualization, and based on the aggregation, provide a sub-plurality of data elements representative of the plurality of data elements 102 to the visualization module 106 for display. For example, when a data visualization is displayed on a computer screen, multiple data points may need to be mapped at one screen pixel because the data resolution is higher than the screen resolution. However, there is no need to load all data through a network that may be slow, and generate a full-resolution data visualization. Instead, data may be aggregated based on the display resolution at a computing node close to the data repository to reduce data transfer overhead to generate intermediate data visualizations that do not include all the data elements.

System 100 includes a visualization module 106 to progressively display a data visualization, via an interactive graphical user interface, the data visualization including an overview visualization 106A and a detailed visualization 106B. The data visualization generally displays a sub-plurality of the plurality of data elements 102A. The data visualization is generally based on at least one of data resolution and display resolution. The term "progressively display" as used herein, refers to an incremental display of data elements. For example, when it takes longer than interactive rate to load data and generate a full data visualization, a progressive strategy may be applied to render the data visualization (e.g., overview visualization 106A) incrementally, rather than generate a full-resolution data visualization. Accordingly, a user need not wait a long time before obtaining a first data visualization, such as the overview visualization 106A, and may begin to observe interesting patterns at a coarse level even as new details are added based on additional incoming data elements. In some examples, the data visualization may be a three-dimensional scatterplot.

In some examples, a user, such as a Subject Matter Expert ("SME"), may specify a mapping of data attributes to scatterplot axes. For example, the mapping may specify a mapping of the data elements based on data attributes such as "time", "dpt", and "spt". Also, for example, the mapping may specify a mapping of the data elements based on data attributes such as "time", "slong", and "slat", where slong may refer to source longitude and slat may refer to source latitude. Based on such user input, the data module 102 may incrementally send out data to the visualization module 106, and the data visualization may be incrementally rendered based on incoming data.

SMEs may typically want to rapidly explore big data, discover unexpected patterns, and/or turn insights into swift decision-making and actions. As used herein, an SME may be an individual with knowledge of domain relevance. A domain, as used herein, may be an environment associated with the input data, and domain relevance may be semantic and/or contextual criteria relevant to aspects of the domain. For example, the input data may be representative of Web navigation logs (e.g. click stream), the domain may be the domain name servers that are visited via the navigation logs, the domain relevance may be semantic and/or contextual criteria relevant to analysis of internet traffic, and the SME may be a network manager. Also, for example, the input data may be related to operational or security logs, the domain may be a secure office space for which the security logs are being maintained and/or managed, the domain relevance may be semantic and/or contextual criteria relevant to tracking security logs based on preferences such as location, time, frequency, error logs, warnings, and so forth, and the SME may be a member of the security staff.

In some examples, the visualization module 106 may automatically add data elements of the plurality of data elements 102A to the data visualization. For example, based on the display resolution and/or data resolution 104, the data module 102 may access batches of representative data elements from a data repository, and the visualization module 106 may continuously load, render and blend with an existing data visualization (e.g., overview visualization 106A and/or detailed visualization 106B). In some examples, based on the display resolution 104, the visualization module 106 may load, for rendering the data visualization, only data projected into a perceivable display space in a screen.

In some examples, the data visualization includes the detailed visualization 106B, and the visualization module 106 displays the detailed visualization 106B based on an interaction 108 with the overview visualization 106A. As used herein, the term "overview visualization" may refer to any intermediate visualization that may be rendered before a "detailed visualization" of the intermediate visualization is displayed. For example, a first detailed visualization may be rendered based on interactions 108 with a first overview visualization. However, as the visualization module 106 progressively renders the first detailed visualization, the user may interact with the first detailed visualization to generate a second detailed visualization. In such instances, the first detailed visualization may be considered as a second overview visualization, and the second detailed visualization is a detailed visualization of the second overview visualization (or the first detailed visualization). Accordingly, a detailed visualization may iteratively play a role of an overview visualization.

In some examples, a user may zoom in from an overview visualization to focus on a local part of the visualization. Accordingly, only a portion of data that are mapped to the region of interest may be loaded and rendered as the detailed visualization 106B. Accordingly, data transfer and view rendering overhead may be reduced.

In some examples, the visualization module 106 may automatically predict a future visualization based on the interaction 108 with a prior visualization. For example, while the user is exploring the data, the visualization module 106 may predict the user's next step in data exploration and may preload the data to generate a successive visualization. For example, the user may move a mouse, and the visualization module 106 may predict a future visualization by rendering data elements from the portion of the existing data visualization in a direction of movement of the mouse. Also, for example, the user may be viewing a portion of the existing data visualization, and the visualization module 106 may communicate with the data module 102 to analyze data features for data elements in the viewed portion of the existing data visualization, for possible display. Also, for example, the user may be viewing data features such as "time", "dpt", "spt" etc., and the visualization module 106 may communicate with the data module 102 to analyze data features (including derived data features) related to the viewed data features.

System 100 includes an interaction module 110 to process the interaction 108 with the overview visualization 106A. In some examples, the interaction 108 may be related to one of data filtering 112, display modification, selection, and zoom operation. The term "data filtering" as used herein may generally refer to a selection of a sub-plurality of data elements that are rendered in a given visualization. For example, a user may select a portion of the overview visualization 106A, and the visualization module 106 may render only the data elements in the selected portion. Accordingly, the data elements in the selected portion may be filtered from the data elements that are rendered. As disclosed herein, the user may perform data filtering 112 by directly cutting out and/or masking out a portion of the overview visualization 106A and/or the overview visualization 106B. The term "display modification" refers to a change in a mapping of data attributes to axes in an existing data visualization.

In some examples, the data filtering 112 may include zoom operations performed on the data visualization (e.g., overview visualization 106A, detailed visualization 106B). For example, the user may zoom in from the overview visualization 106A and focus on a local part of the overview visualization 106A. Accordingly, only the portion of input data 102 that is mapped to the region of interest may be loaded and rendered. In this way, data transfer and view rendering overhead may be reduced. Also, for example, while the overview visualization 106A is being rendered, the user may zoom in to a portion of the visualization to analyze visual patterns in a detailed visualization 106B. When the user zooms in to a portion of the overview visualization 106A, data elements in a boundary of the zoomed in portion of the overview visualization 106A may be synchronized with the data source in the data module 102, and the data module 102 may send out the corresponding data elements for rendering the detailed visualization 106B. From the detailed visualization 106B, the user may zoom out to the overview visualization 106A. Such zoom operations may be performed successively to analyze the data and detect patterns. As described herein, such interactions 108 may be performed while the data visualization is being progressively rendered.

In some examples, the interaction 108 may include selection of a portion of the overview visualization 106A, the selection including at least one of bounding box, lasso, and pinpointing. For example, a user may select a free-form region on the overview visualization 106A and/or the detailed visualization 106B to filter out data elements, or for further observation and/or analysis. Also, for example, the user may interact with the overview visualization 106A and/or the detailed visualization 106B, and may utilize interaction tools, such as bounding box, lasso, or pinpointing, to select a portion of rendered data elements.

In some examples, the interaction 108 may include data modification based on identifying a mapping between data dimensions and scatterplot axes. For example, a user may manipulate the axes mapping in scatterplots. Also, for example, a user may change the visual mapping of the axes on a displayed scatterplot to reconstruct a new data visualization (e.g., overview visualization 106A, detailed visualization 106B).

In some examples, the interaction module 110 may process the interaction 108 while the data visualization is being displayed. For example, the user may interact with the overview visualization 106A and/or the detailed visualization 106B while data elements are being rendered for display. In some examples, the user may manipulate the axes mapping in scatterplots while data elements are being rendered for display for the overview visualization 106A and/or the detailed visualization 106B. Also, for example, the user may smoothly zoom in to local regions of the detailed visualization 106B, and zoom out to the overview visualization 106A while the visualizations are being progressively rendered. A smooth transition from one data visualization to the next based on such zoom operations may achieved by switching between an on-going generation of the overview visualization 106A and an on-demand detailed visualization 106B.

In some examples, the visualization module 106 generates a sequence of collections of data elements based on successive visualizations of the collections of data elements. In some examples, the visualization module 106 ranks the sequence of collections of data elements based on domain relevance. For example, a sequence of smaller portions of data may be extracted from the data repository for progressive rendering of the data visualization (e.g., overview visualization 106A, detailed visualization 106B). Over time, the sequence of data may be randomly sampled and/or analyzed and ranked/ordered based on importance. In some examples, the sequence of collections of data elements may be based on derived attributes of the data elements.

System 100 includes an analytics module 116 to analyze the interaction 108 to generate a deployment rule 118. Generally, a deployment rule is a rule associated with individual and/or groups of data elements based on aspects of an interaction. Such a deployment rule may be utilized by system 100 to provide automatic visualization features in future visualizations. In some examples, such a deployment rule may be utilized by system 100 to guide a user with analysis of data. For example, if a portion of data is selected, the user may examine its statistical importance, display it using another visualization, and/or launch data analysis of the portion of data, related metadata, derived data, and/or underlying characteristics of data, to find a semantic definition for an observed pattern. A deployment rule 118 may be generated based on such analysis. As another example, the user may specify an observed data pattern 114 which may be further analyzed, based for example, on visualization and/or automatic analytics, to generate a deployment rule 118, such as queries, for future data visualizations. Also, for example, the user may prefer to view certain portions of data via a specified display modification. For example, the user may view a certain portion of data based on a specified mapping between data dimensions and scatterplot axes. Accordingly, the analytics module 116 may generate a deployment rule 118 for such identified portion of data based on the user specified display modification.

In some examples, the analytics module 116 performs automated analytics based on the deployment rule 118. For example, once a deployment rule 118 is generated based on the observed pattern 114, the deployment rule 118 may be deployed to generate more meaningful visualizations. For example, any detected patterns, either a point or a region on the scatterplot, may be analyzed further to discover why the detected patterns have a particular shape, and the reasons to the "why" may be constructed as deployment rules 118 for future automatic pattern detection. In some examples, the data module 102 may associate the interaction 108 with the deployment rule 118.

For example, a first deployment rule may be generated by analyzing a selected pattern. Accordingly, the data module 102 may associate the selected pattern with the first deployment rule. Based on the first deployment rule, the analytics module 116 may perform automated analytics based on a pattern matching and/or pattern detection technique to identify and provide similar patterns.

Also, for example, a second deployment rule may be generated by analyzing a user's interactions, such as for example, searching for a collection of IP addresses, or changing a mapping of axes for visualization, and so forth. Accordingly, the data module 102 may associate the interactions with the second deployment rule. Based on the second deployment rule, the analytics module 116 may perform automated analytics by identifying data related to the queried data (e.g., identify data elements that have similar IP addresses), and/or by providing visualizations based on the selected mapping of axes.

The components of system 100 may be computing resources, each including a suitable combination of a physical computing device, a virtual computing device, a network, software, a cloud infrastructure, a hybrid cloud infrastructure that includes a first cloud infrastructure and a second cloud infrastructure that is different from the first cloud infrastructure, and so forth. The components of system 100 may be a combination of hardware and programming for performing a designated function. In some instances, each component may include a processor and a memory, while programming code is stored on that memory and executable by a processor to perform a designated function.

For example, data module 102 may comprise multiple databases communicatively linked over a network, and optionally distributed spatially over a geographic area, that may include portions of the plurality of data elements 102A. Data module 102 may include hardware to physically store the plurality of data elements 102A, and processors to physically process the plurality of data elements 102A. Data module 102 may also include software algorithms to process the plurality of data elements 102A and share them over a network. Data module 102 may also include software programming to dynamically interact with the visualization module 106 to receive the interactions 108 for data filtering 112.

As another example, visualization module 106 may include software programming to progressively display a data visualization, and include hardware to provide the display via an interactive graphical user interface. Visualization module 106 may also include software programming to dynamically interact with the interaction module 110 to receive the interactions 108. Also, for example, the interaction module 110 may include software programming that processes the interaction 108 with the overview visualization 106A.

Also, for example, the analytics module 116 may include software programming to receive patterns 114 from the visualization module 106, and analyze the interaction 108 to generate a deployment rule 118.

Generally, the components of system 100 may include programming and/or physical networks to be communicatively linked to other components of system 100. In some instances, the components of system 100 may include a processor and a memory, while programming code is stored and on that memory and executable by a processor to perform designated functions.

Generally, the computing device may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform an interactive analysis based on progressive visualizations. Computing device may include a processor and a computer-readable storage medium.

Figure 2:
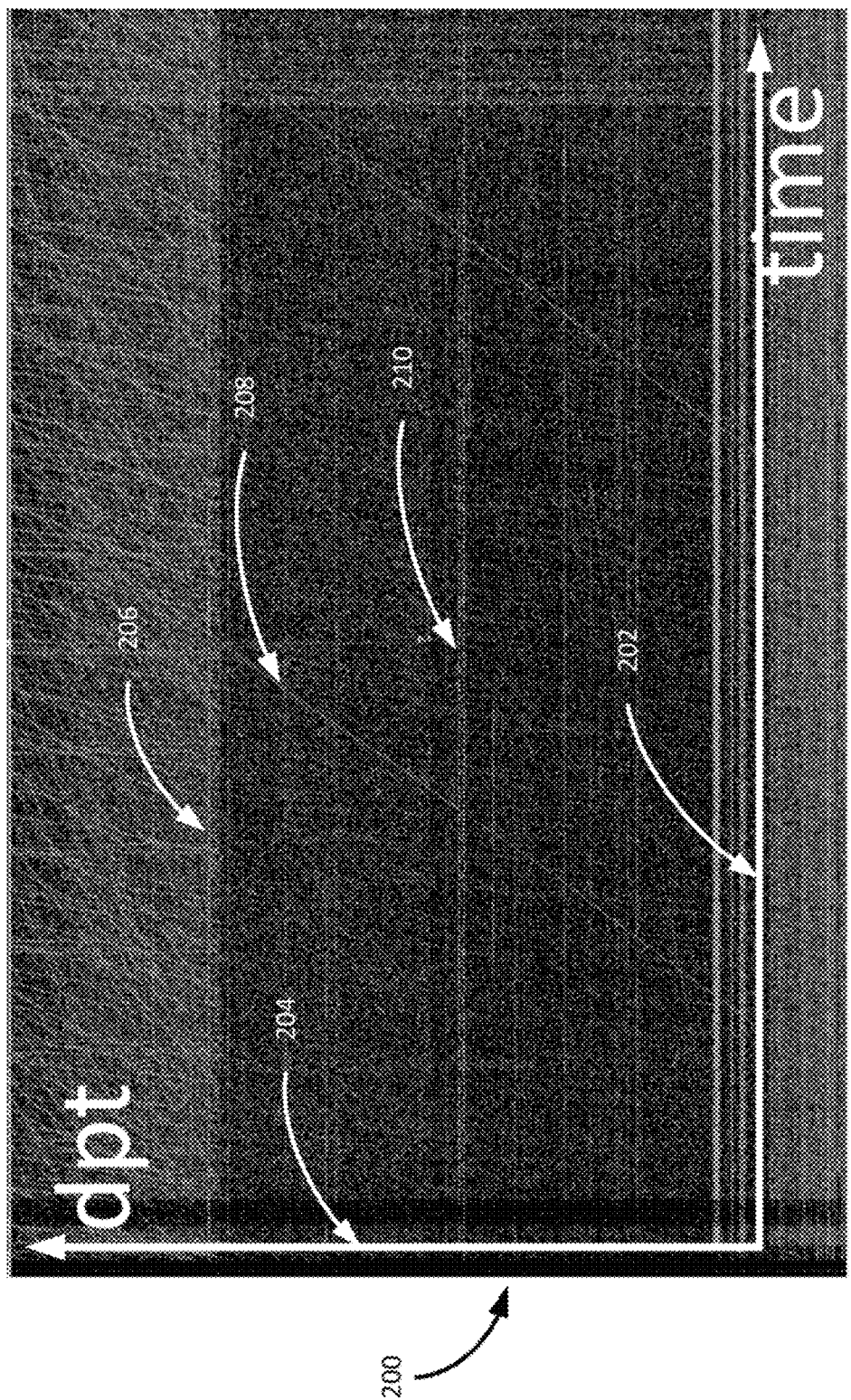
FIG. 2 is an example of a two-dimensional overview visualization.

FIG. 2 is an example of a two-dimensional overview visualization 200. In this example, the overview visualization 200 is a two-dimensional scatterplot for a cyber-security dataset that includes 500 million records and 261 data attributes. Display of a large volume of high-dimensional data, potentially located in spatially distributed databases, may pose substantial technical challenges. However, as described herein, the overview visualization 200 is a progressive rendering of a portion of the entire cyber-security dataset. Data points are added even as a user is provided with interactive functionality to conduct data analysis. The overview visualization 200 may be based on display resolution and size, users' data exploration intentions, and visual perception abilities of a user. As illustrated, the horizontal axis 202 may represent "Time" and the vertical axis 204 may represent "dpt". Also illustrated are a first line pattern 206, a second line pattern 208, and a third line pattern 210. As data elements are added to the visualization, more details and patterns may emerge. Each pixel in the visualization may represent a data element with a plurality of data attributes.

Figure 3:
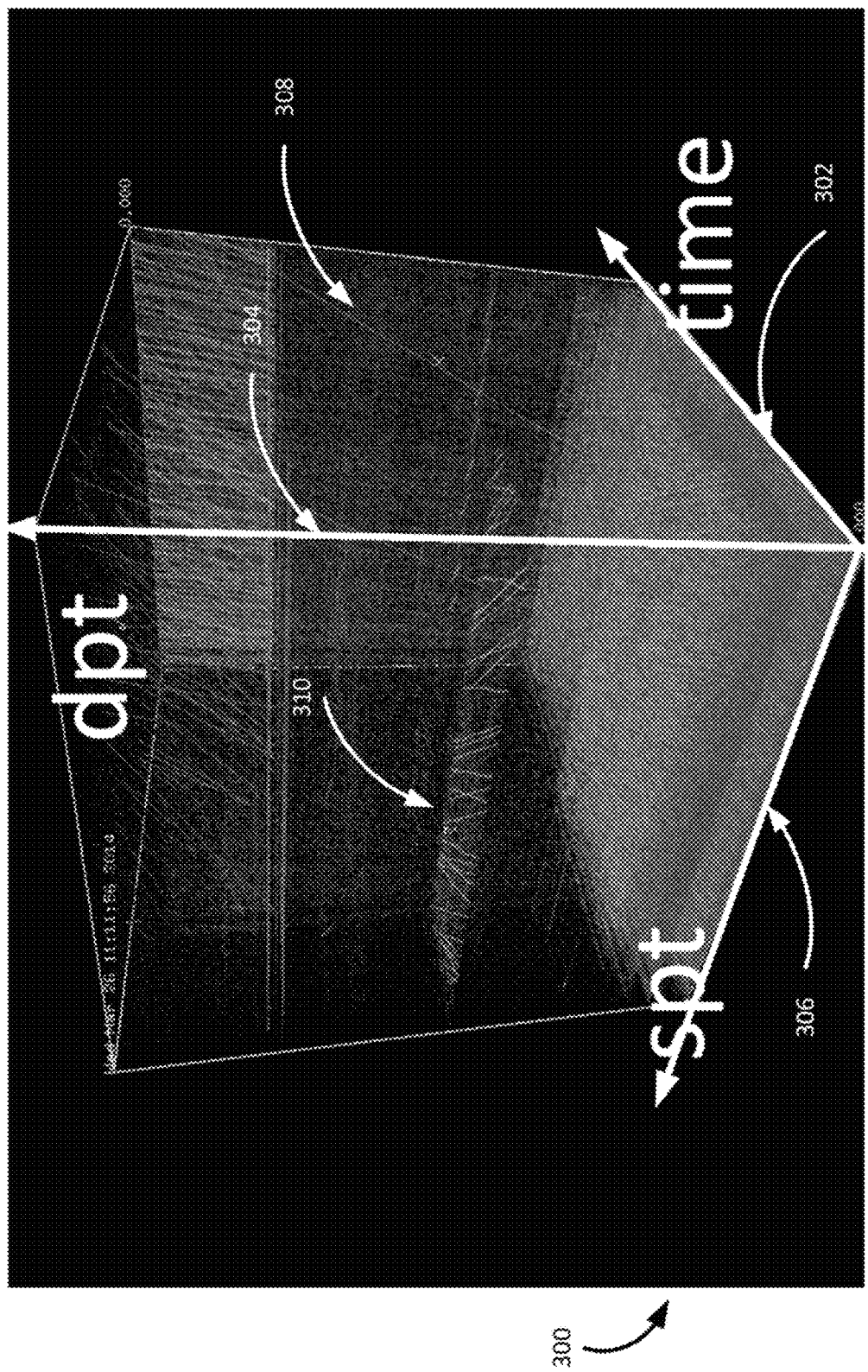
FIG. 3 is an example of a three-dimensional overview visualization.

FIG. 3 is an example of a three-dimensional overview visualization 300. In this example, the overview visualization 300 is a three-dimensional scatterplot for a cyber-security dataset that includes 500 million records and 261 data attributes. A three-dimensional display of a large volume of high-dimensional data, potentially located in spatially distributed databases, may pose substantial technical challenges. However, as described herein, the overview visualization 300 is a progressive rendering of a portion of the entire cyber-security dataset. Data points are added even as a user is provided with interactive functionality to conduct data analysis. For example, the user may choose to change a mapping of axes to attributes to view a different visualization of the data elements, while data elements are progressively rendered. Also, for example, the overview visualization 300 may be based on display resolution and size, users' data exploration intentions, and visual perception abilities of a user. As illustrated, a first axis 302 may represent "Time", a second axis 304 may represent "dpt", and a third axis 306 may represent "spt". Each pixel in the visualization may represent a data element with a plurality of data attributes. Also illustrated are a first line pattern 308, a second two-dimensional pattern 310.

Figure 4:
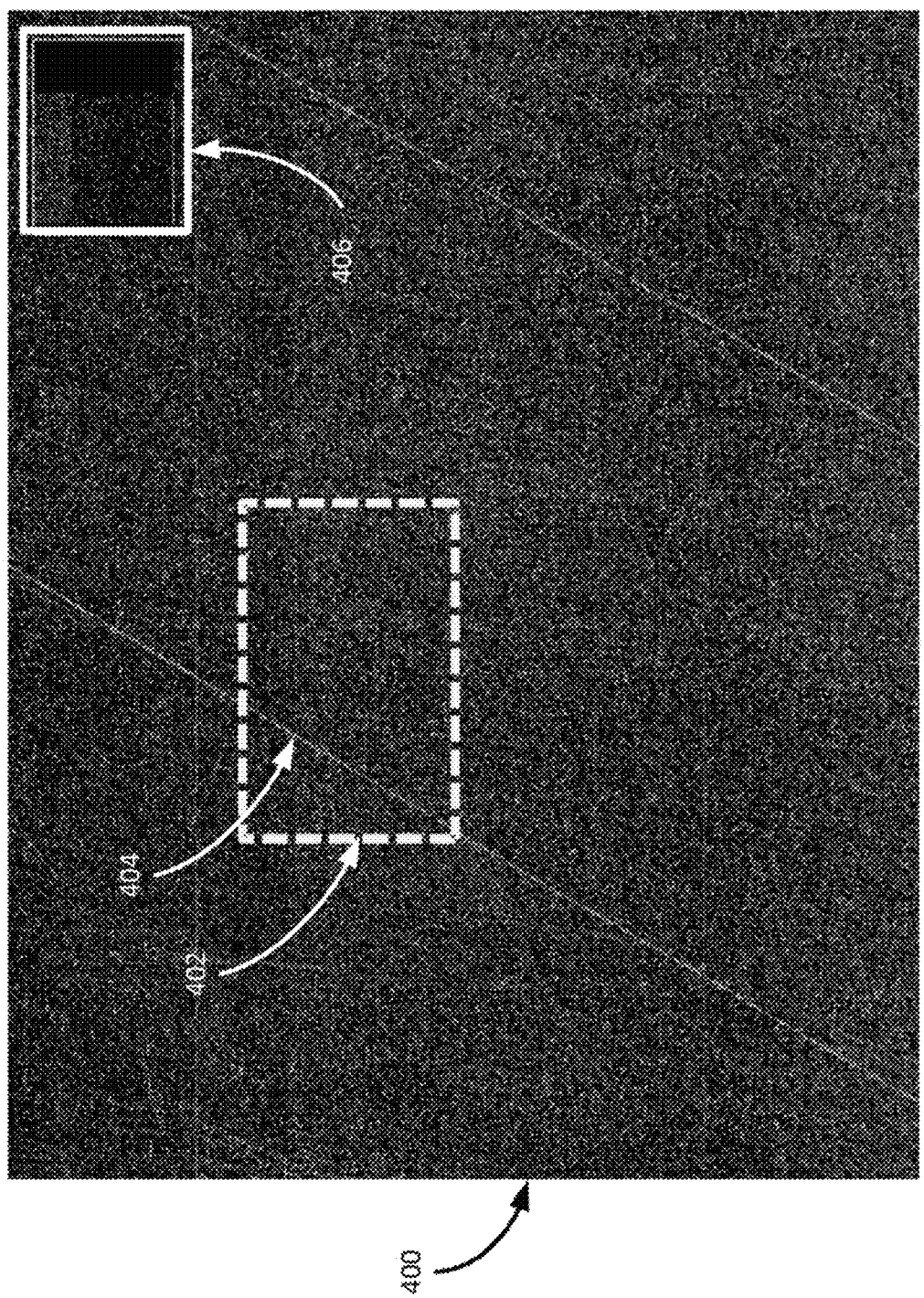
FIG. 4 is an example illustration of a zoom operation performed on the example overview visualization of FIG. 2.

FIG. 4 is an example illustration 400 of a zoom operation performed on the example overview visualization 200 of FIG. 2. For example, a user may pan and zoom to locate one region 402, illustrated here as a bounding box, in the two-dimensional scatterplot 200 of FIG. 2 to examine interesting patterns, such as a line pattern 404. During this zoom operation, more detailed data within the bounding box region 402 may be loaded to render a detailed visualization. In some examples, the detailed visualization 400 may include the overview visualization 200 of FIG. 2 as an inset 406. In some examples, the inset 406 may be selected to zoom out to the overview visualization 200 of FIG. 2. The user may select a new region of interest, and zoom in to another detailed visualization. Such steps of zooming in from an overview visualization to a detailed visualization, and zooming out from a detailed visualization to the overview visualization may be performed iteratively.

Figure 5:
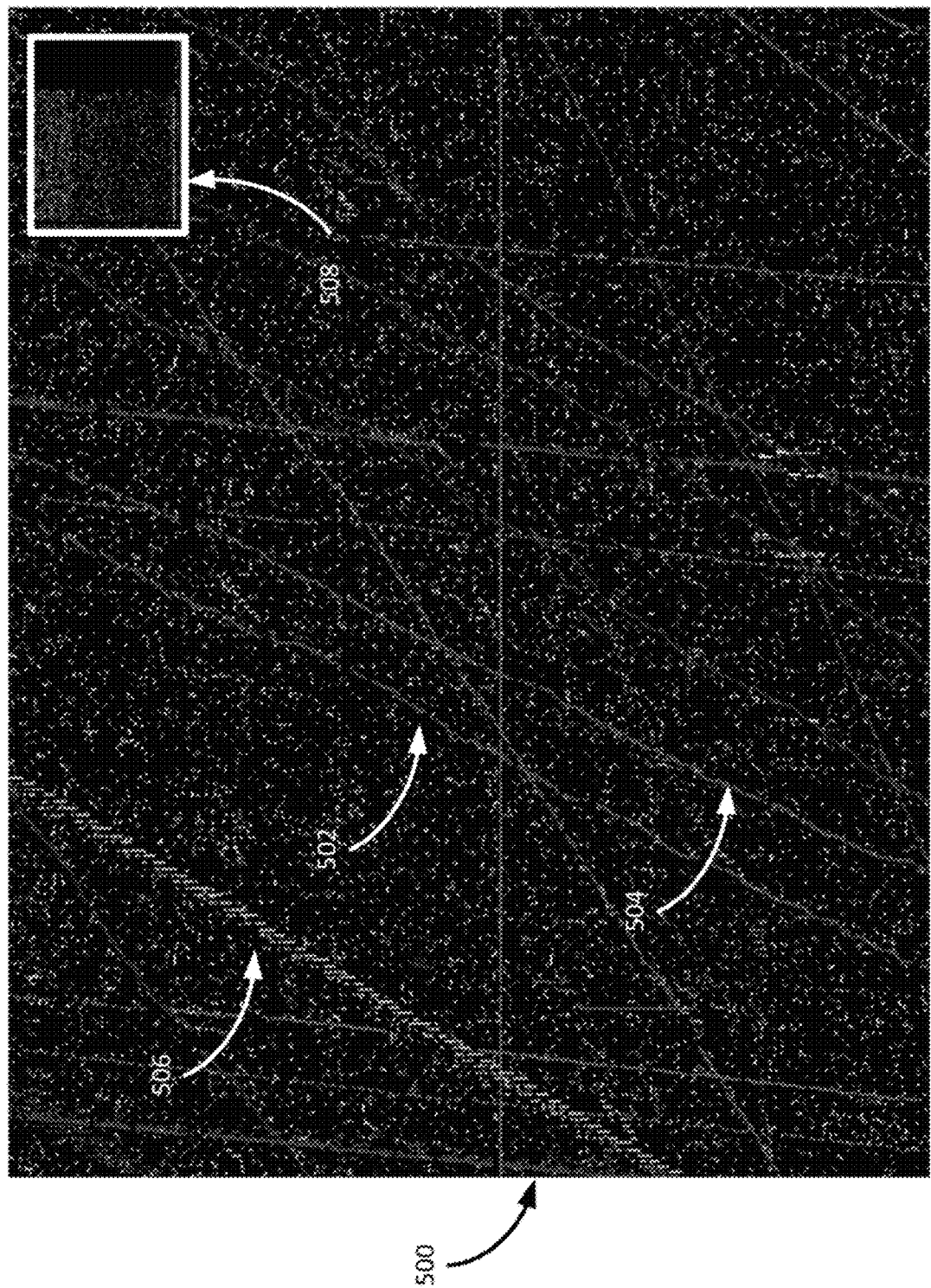
FIG. 5 is an example of a detailed visualization based on the zoom operation illustrated in FIG. 4.

FIG. 5 is an example of a detailed visualization 500 based on the zoom operation illustrated in FIG. 4. As illustrated, the user may zoom in from the overview visualization 200 of FIG. 2 to the detailed visualization 400 of FIG. 4, and further zoom in to another detailed visualization 500, as described herein. During this zoom operation, more detailed data within the bounding box region 402 of FIG. 4 may be loaded to render the detailed visualization 500.

For example, some straight line patterns that are not visible in FIG. 4 may appear in the detailed visualization 500 of FIG. 5 after zooming in to the bounding box region 402 illustrated in FIG. 4. For example, a first pattern 502, a second pattern 504, and a third pattern 506 are visible in the detailed visualization 500.

In some examples, the detailed visualization 500 may include the detailed visualization 400 of FIG. 4 as an inset 508. In some examples, the inset 508 may be selected to zoom out to the detailed visualization 400 of FIG. 4. The user may select a new region of interest in the detailed visualization 400 of FIG. 4, and zoom in to another detailed visualization. Such steps of zooming in from an overview visualization to a detailed visualization, and zooming out from a detailed visualization to the overview visualization may be performed iteratively.

Figure 6:
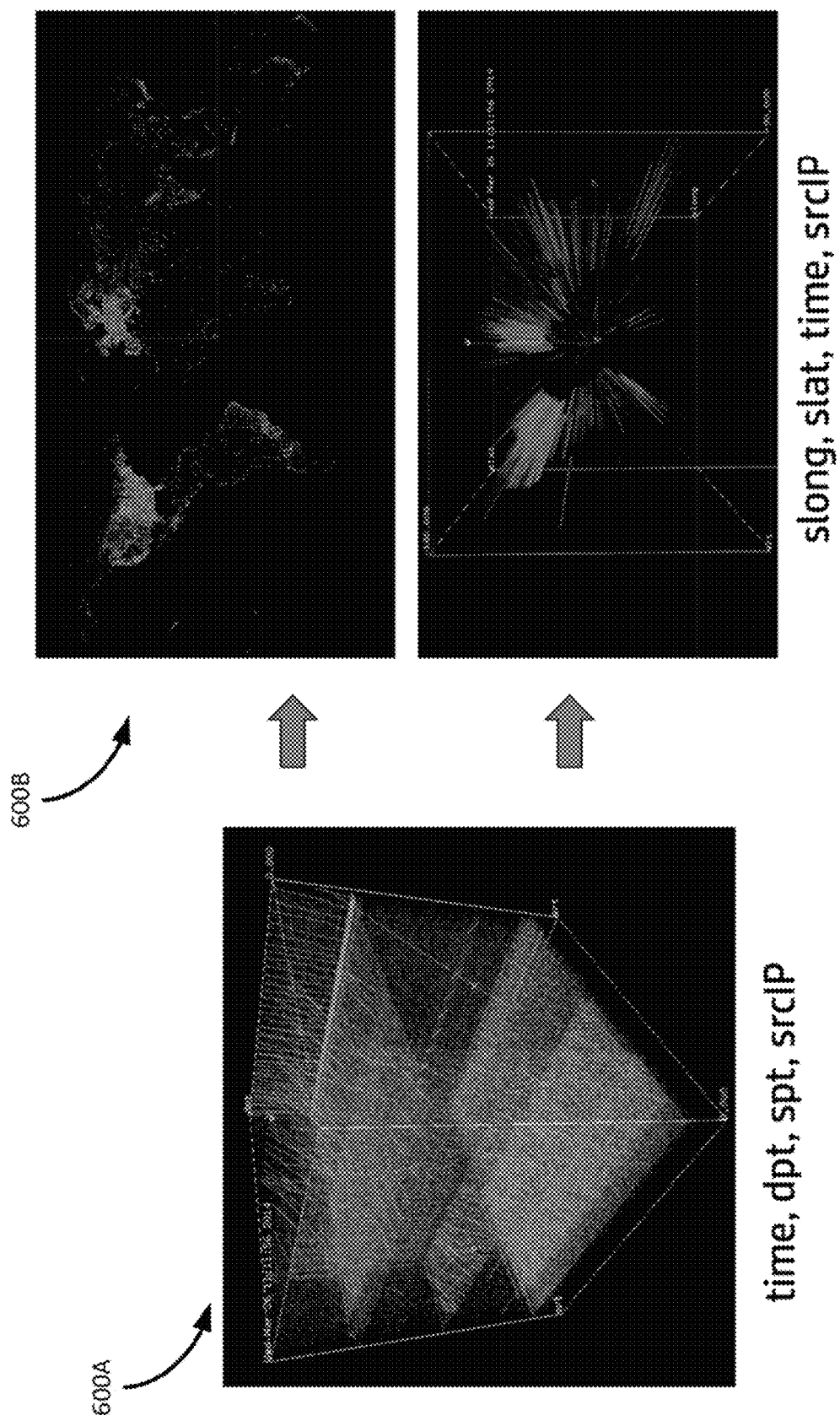
FIG. 6 illustrates a detailed visualization based on a mapping between data attributes and scatterplot axes.

FIG. 6 illustrates a detailed visualization based on a mapping between data attributes and scatterplot axes. For example, a first three-dimensional visualization 600A represents data elements based on data attributes of "time", "dpt", and "spt". As described herein, a user may change the mapping of scatterplots axes to see different views for the same set of data elements. For example, a second three-dimensional visualization 600B represents data elements based on data attributes of "slong", "slat", and "time".

Figure 7:
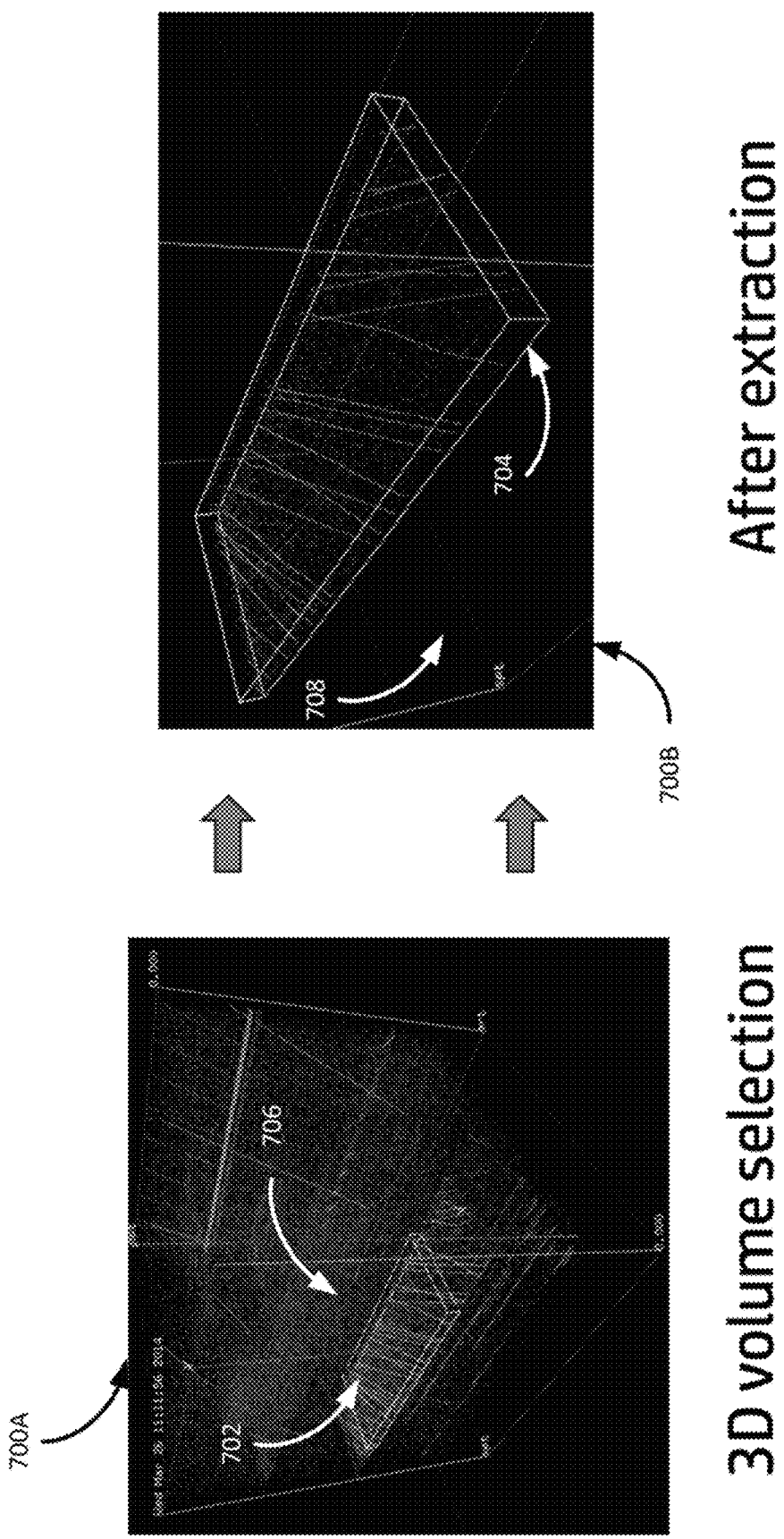
FIG. 7 illustrates an example of a detailed visualization based on data filtering.

FIG. 7 illustrates an example of a detailed visualization based on data filtering. For example, a first three-dimensional scatterplot 700A illustrates an example of selecting a three-dimensional volume by utilizing a bounding box 702. In the first three-dimensional scatterplot 700A, after zooming in and out for a while, a user may detect a group of interesting patterns. By using the bounding box 702, the user may extract the group of interesting patterns. The extracted group of interesting patterns is illustrated in a second three-dimensional scatterplot 700B. The bounding box 702 of the first three-dimensional scatterplot 700A is illustrated as the bounding box 704 in the second three-dimensional scatterplot 700B, where the bounding box 704 includes data elements from the first three-dimensional scatterplot 700A that are filtered based on the bounding box 702. For example, all the data elements 706 outside bounding box 702 may be filtered out to render the second three-dimensional scatterplot 700B. As illustrated the data elements 706 outside the bounding box 702 are filtered out, as indicated by the blank region 708 surrounding the bounding box 704.

As described herein, the user may further analyze patterns based on changing a mapping between data attributes and scatterplot axes. Accordingly, the user may have additional options of projecting the extracted patterns in the bounding box 704 into other dimensional spaces to further investigate how the extracted group of interesting patterns may be distributed in different dimensional spaces.

Figure 8:
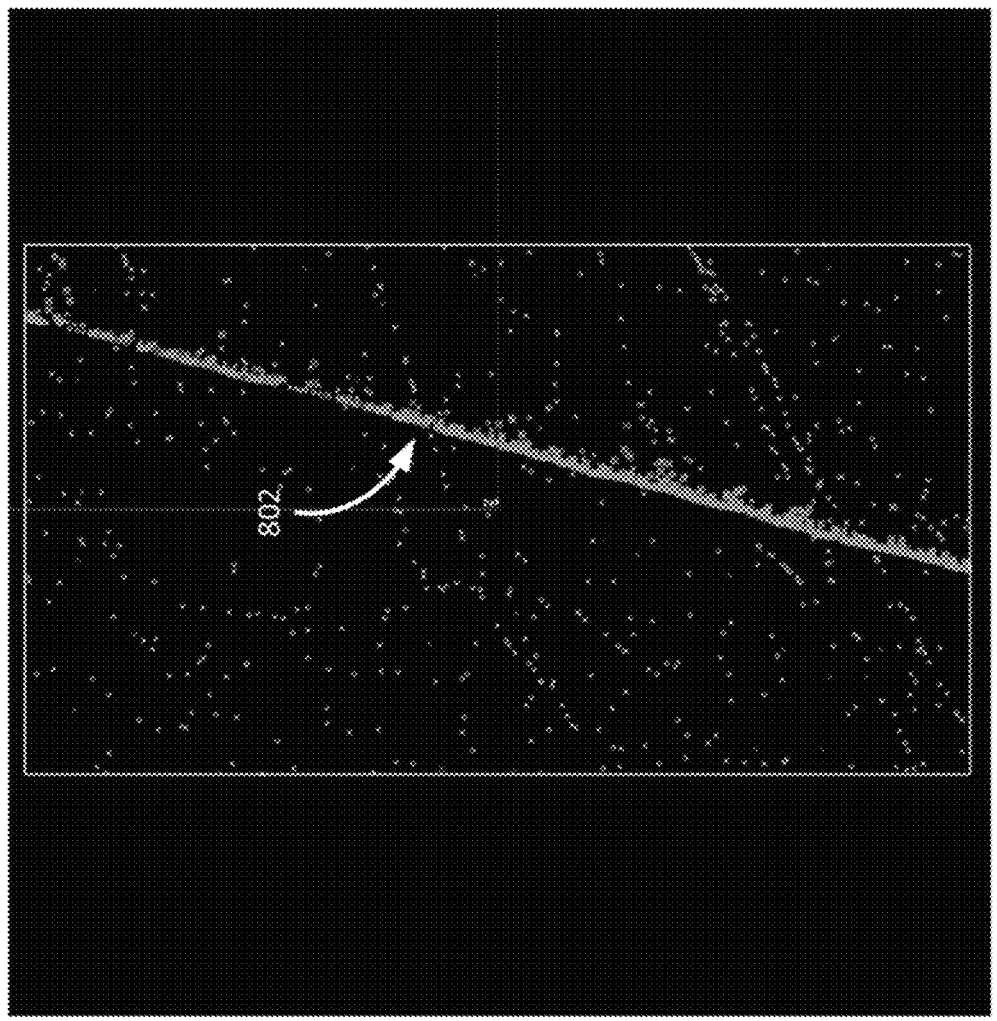
FIG. 8 illustrates an example of extracting a pattern in a visualization to generate a deployment rule.

FIG. 8 illustrates an example of extracting a pattern 802 in a data visualization 800 to generate a deployment rule. For example, a line pattern 802 may be extracted, and an entropy may be determined for each data attribute for the data elements represented by line pattern 802. A deployment rule may be generated based on such entropies. For example, data attributes with entropy lower than a threshold may be selected. Such attributes with all their value ranges may be set as a deployment rule for this line pattern 802. Such a deployment rule may be applied to other local visualizations and similar patterns may be automatically detected in a spatial region.

Figure 9:
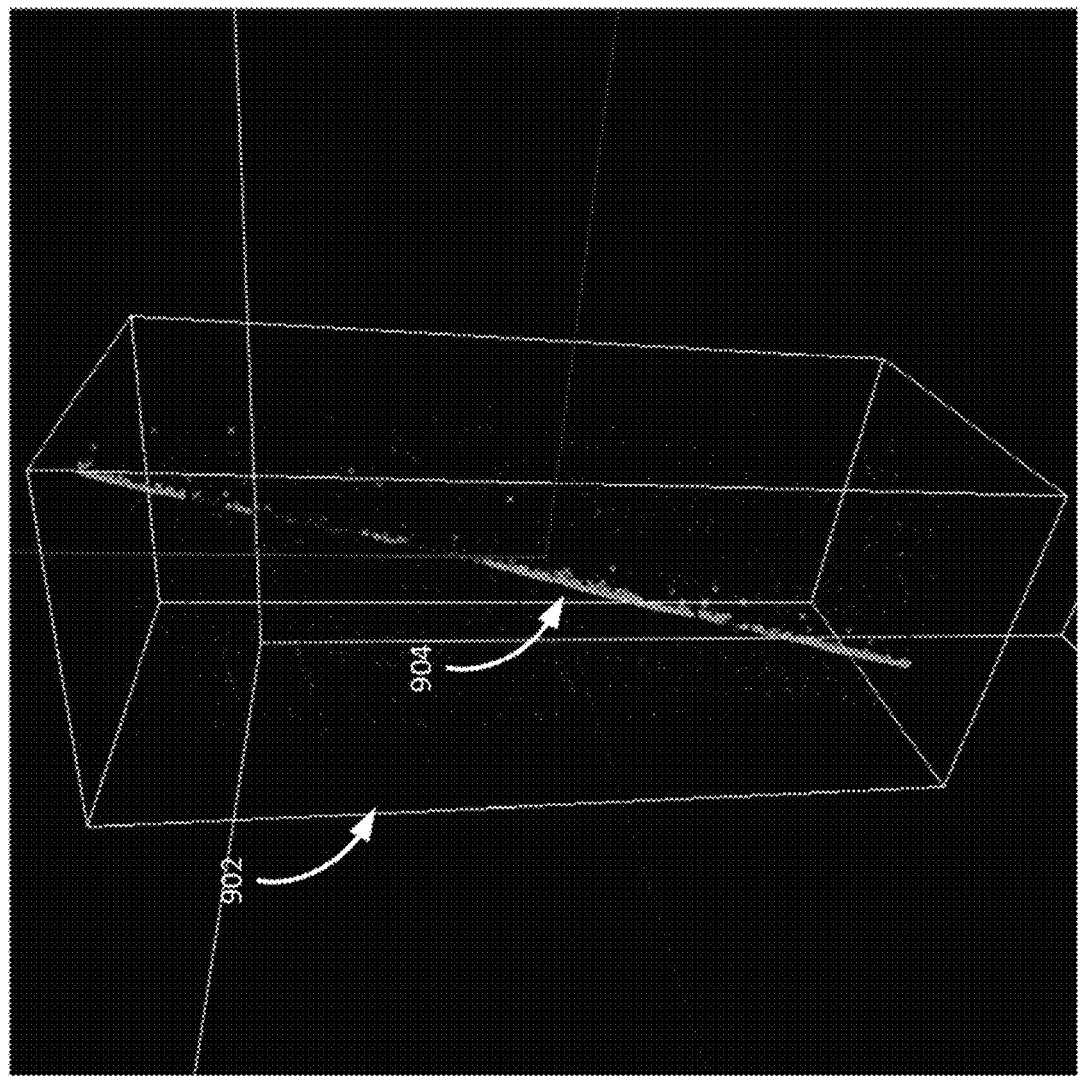
FIG. 9 illustrates an example of performing automated analytics based on the deployment rule illustrated in FIG. 8.

FIG. 9 illustrates an example of performing automated analytics based on the deployment rule illustrated in FIG. 8. A data visualization 900 is illustrated with a bounding box 902. Based on the deployment rule generated in FIG. 8, presence of a line pattern 904 in the bounding box 902 may be identified, based on attributes with all value ranges, as determined by the deployment rule.

Figure 10:
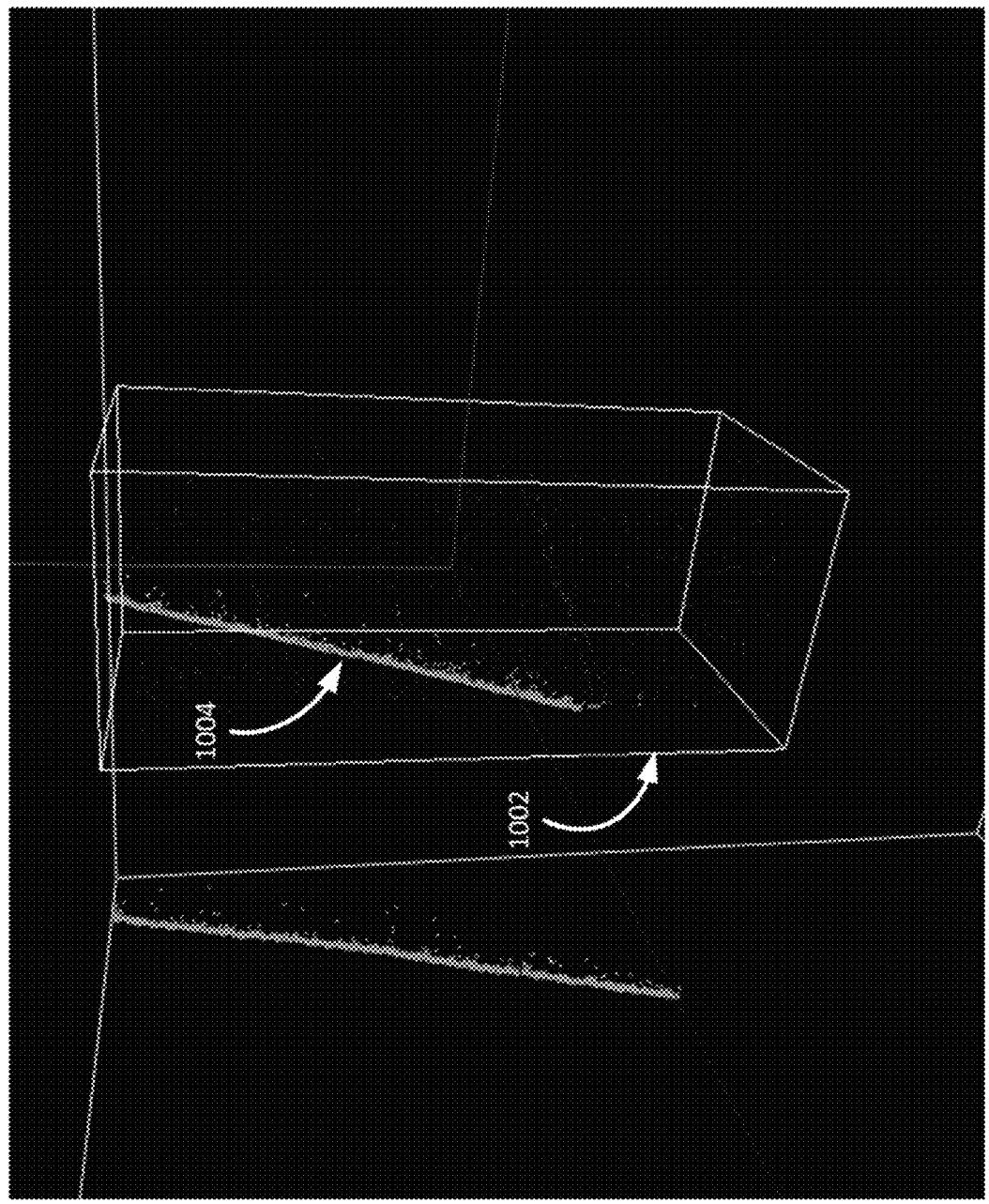
FIG. 10 illustrates another example of performing automated analytics based the deployment rule illustrated in FIG. 8.

FIG. 10 illustrates another example of performing automated analytics based on the deployment rule illustrated in FIG. 8. A data visualization 1000 is illustrated with a bounding box 1002. Based on the deployment rule generated in FIG. 8, presence of a line pattern 1004 in the bounding box 1002 may be identified, based on attributes with all value ranges, as determined by the deployment rule.

Figure 11:
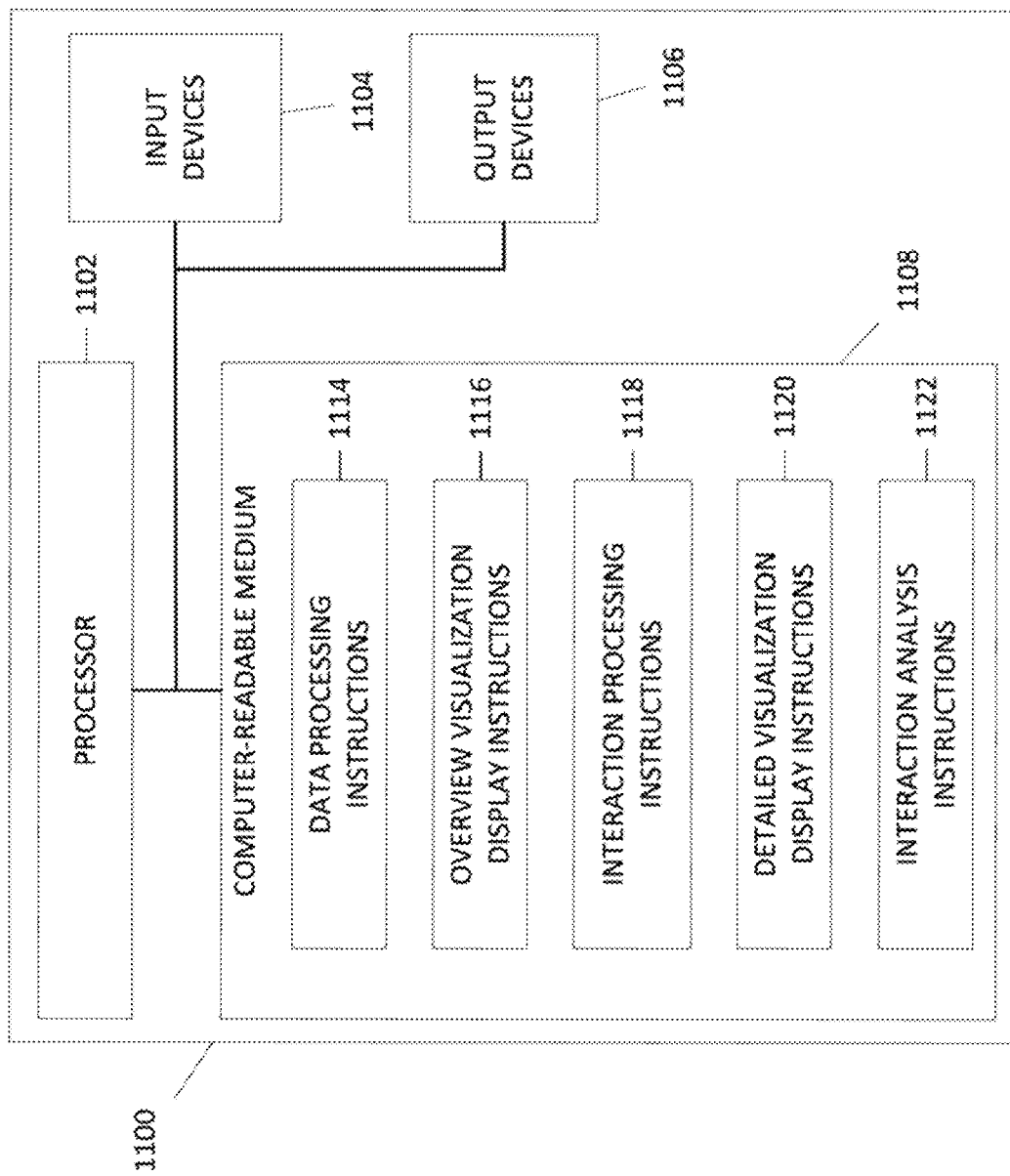
FIG. 11 is a block diagram illustrating one example of a computer readable medium for interactive analysis based on progressive visualizations.

FIG. 11 is a block diagram illustrating one example of a computer readable medium for interactive analysis based on progressive visualizations. Processing system 1100 includes a processor 1102, a computer readable medium 1108, input devices 1104, and output devices 1106. Processor 1102, computer readable medium 1108, input devices 1104, and output devices 1106 are coupled to each other through a communication link (e.g., a bus).

Processor 1102 executes instructions included in the computer readable medium 1108. Computer readable medium 1108 includes data processing instructions 1114 to process a plurality of data elements.

Computer readable medium 1108 includes overview visualization display instructions 1116 to progressively display, via an interactive graphical user interface, an overview visualization of a sub-plurality of the plurality of data elements, the overview visualization based on at least one of data resolution and display resolution.

Computer readable medium 1108 includes interaction processing instructions 1118 to process an interaction with the overview visualization.

Computer readable medium 1108 includes detailed visualization display instructions 1120 to display a detailed visualization based on the interaction with the overview visualization.

Computer readable medium 1108 includes interaction analysis instructions 1122 to analyze the interaction to generate a deployment rule. In some examples, the interaction analysis instructions 1122 may include instructions to associate the interaction with the deployment rule.

Input devices 1104 include a keyboard, mouse, data ports, and/or other suitable devices for inputting information into processing system 1100. In some examples, input devices 1104, such as a computing device, are used by an interactive graphical user interface to receive the interactions. Output devices 1106 include a monitor, speakers, data ports, and/or other suitable devices for outputting information from processing system 1100. In some examples, output devices 1106 are used to provide visualizations, including overview and detailed visualizations.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g., a hard drive), a solid state drive, and the like, or a combination thereof. For example, the computer readable medium 1108 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

As described herein, various components of the processing system 1100 are identified and refer to a combination of hardware and programming configured to perform a designated visualization function. As illustrated in FIG. 3, the programming may be processor executable instructions stored on tangible computer readable medium 1108, and the hardware may include processor 1102 for executing those instructions. Thus, computer readable medium 1108 may store program instructions that, when executed by processor 1102, implement the various components of the processing system 1100.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium 1108 may be any of a number of memory components capable of storing instructions that can be executed by Processor 1102. Computer readable medium 1108 may be non-transitory in the sense that it does not encompass a transitory signal but instead is made up of one or more memory components configured to store the relevant instructions. Computer readable medium 1108 may be implemented in a single device or distributed across devices. Likewise, processor 1102 represents any number of processors capable of executing instructions stored by computer readable medium 1108. Processor 1102 may be integrated in a single device or distributed across devices. Further, computer readable medium 1108 may be fully or partially integrated in the same device as processor 1102 (as illustrated), or it may be separate but accessible to that device and processor 1102. In some examples, computer readable medium 1108 may be a machine-readable storage medium.

Figure 12:
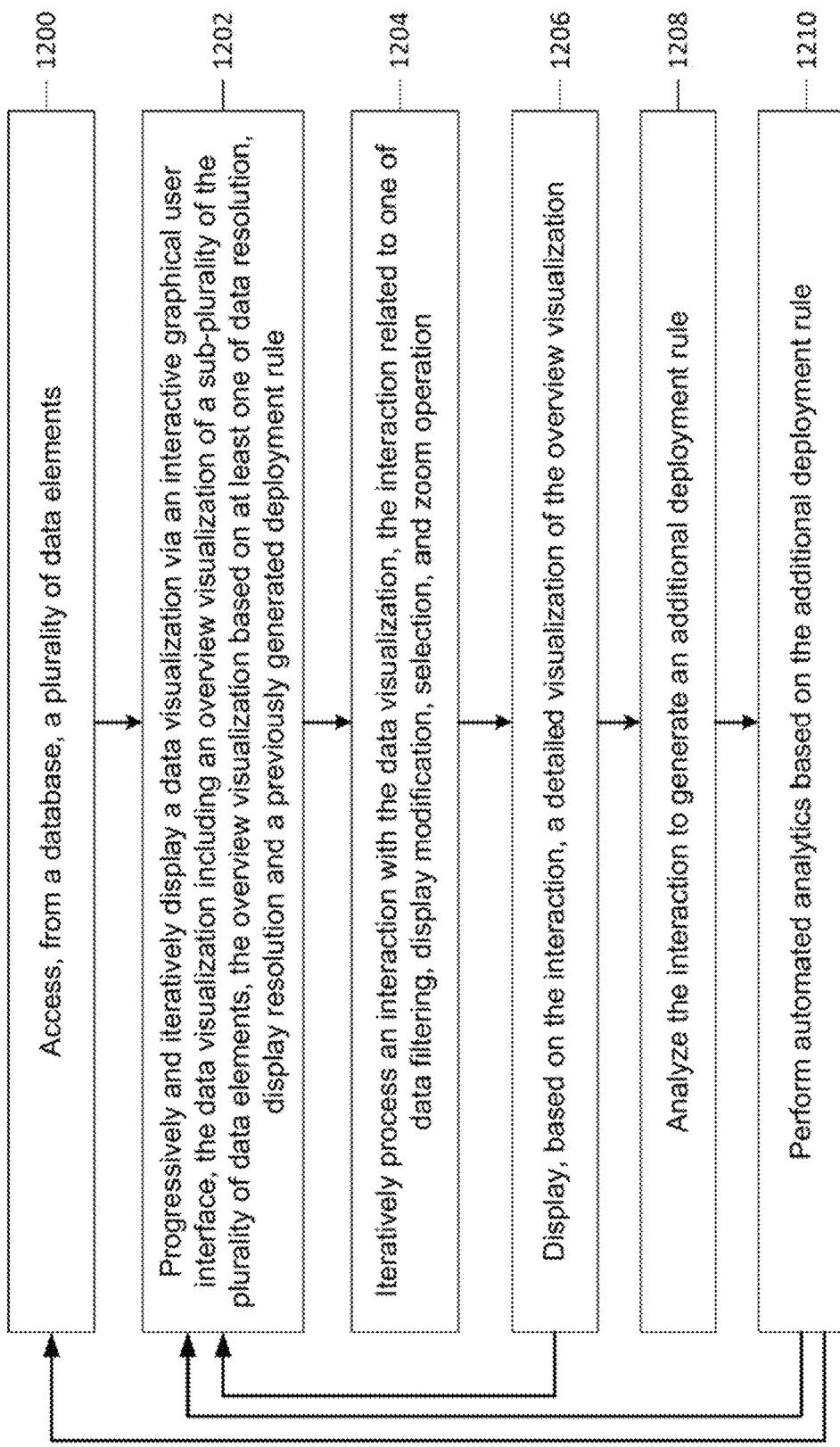
FIG. 12 is a flow diagram illustrating one example of a method for interactive analysis based on progressive visualizations.

FIG. 12 is a flow diagram illustrating one example of a method for interactive analysis based on progressive visualizations. In some examples, such a method may be implemented by system 100 described with reference to FIG. 1. In some examples, instructions to implement various aspects of the method may be stored in a computer readable medium 1108 described with reference to FIG. 11. At 1200, a plurality of data elements may be accesses from a database. At 1202, an overview visualization of a sub-plurality of the plurality of data elements may be progressively and iteratively displayed via an interactive graphical user interface, the overview visualization based on at least one of data resolution, display resolution, and a previously generated deployment rule. At 1204, an interaction with the overview visualization may be iteratively processed, the interaction related to one of data filtering, display modification, selection, and zoom operation. At 1206, based on the interaction, a detailed visualization of the overview visualization may be displayed. In some examples, method may return to 1202 to display the overview visualization from which the detailed visualization was derived.

At 1208, the interaction may be analyzed to generate an additional deployment rule. At 1210, automated analytics may be performed based on the additional deployment rule. In some examples, the method may return to 1202 to display an overview visualization based on the additional deployment rule. In some examples, the method may return to 1200 to access the database based on the additional deployment rule.

In some examples, the method may further include automatically predicting a future visualization based on user interaction with a prior visualization.

In some examples, the method may further include performing automated analytics based on the deployment rule.

In some examples, the interaction may be associated with the deployment rule.

In some examples, the method may further include processing the interaction while the data visualization is being displayed.

In some examples, the method may further include automatically adding data elements of the plurality of data elements to the data visualization.

In some examples, the method may further include generating a sequence of collections of data elements based on successive visualizations of the collections of data elements. In some examples, the method may further include ranking the sequence of collections of data elements based on domain relevance.

In some examples, the data resolution may exceed the display resolution, and the method may further include aggregating the plurality of data elements for the overview visualization.

In some examples, the interaction may include selection of a portion of the overview visualization, the selection including at least one of bounding box, lasso, and pinpointing.

In some examples, the data filtering may include identifying a mapping between data dimensions and scatterplot axes.

In some examples, the interaction may include a zoom operation performed on the data visualization.

In some examples, the data visualization may be a three-dimensional scatterplot.

Figure 13:
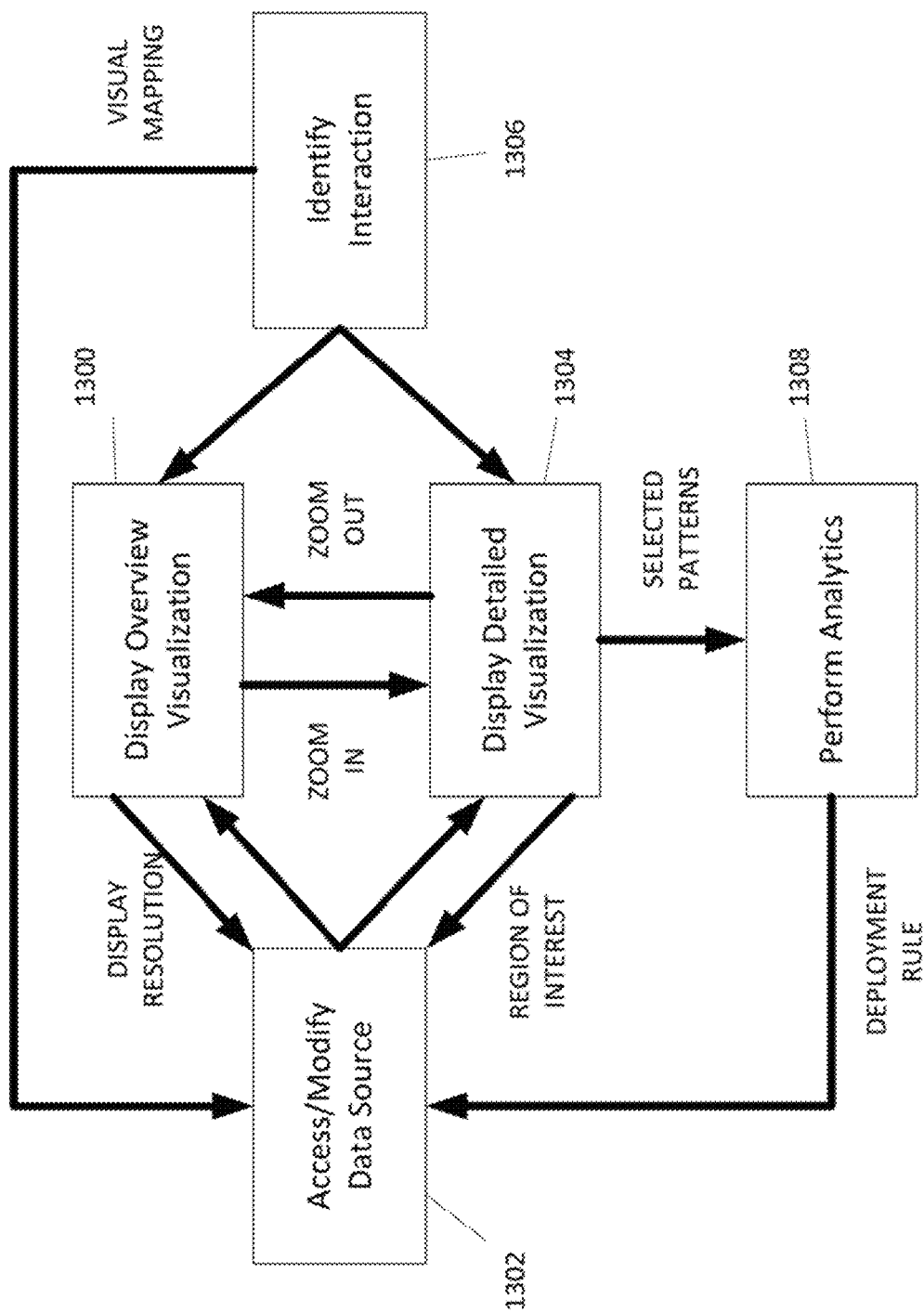
FIG. 13 is a flow diagram illustrating another example of a method for interactive analysis based on progressive visualizations.

FIG. 13 is a flow diagram illustrating another example of a method for interactive analysis based on progressive visualizations. In some examples, such a method may be implemented by system 100 described with reference to FIG. 1. In some examples, instructions to implement various aspects of the method may be stored in a computer readable medium 1108 described with reference to FIG. 11. At 1300, an overview visualization of a sub-plurality of a plurality of data elements may be displayed. In some examples, at 1306, a user may specify a visual mapping of data dimensions to scatterplot axes. At 1302, data corresponding to the visual mapping may be provided. At 1300, an overview visualization corresponding to the visual mapping may be displayed.

As described herein, at 1300, the overview visualization may be rendered incrementally with data sent out from a data source. The data source may include a database and/or a plurality of databases. In some examples, at 1300, a display resolution may be provided to the data source. Accordingly, at 1302, it may be determined that multiple data elements may be projected onto a single pixel. Accordingly, at 1302, the requested data may be aggregated based on screen resolution and data resolution, prior to sending the requested data to be displayed in the overview visualization at 1304.

In some examples, while the overview visualization is being displayed at 1300, the user may zoom in to a more detailed level to examine visual patterns at a detailed visualization displayed at 1304. In some examples, as the user zooms in, a boundary of the visualization may be synchronized with the data source by accessing and/or modifying the data source at 1302. Also, for example, at 1302, data synchronized to the boundary may be sent for rendering a detailed visualization at 1304.

In some examples, while viewing the detailed visualization, a user may zoom out to the overview visualization from which the detailed visualization was generated. Accordingly, in some examples, at 1300, an overview visualization may be displayed, the user may zoom in to a portion of the overview visualization and at 1304, a detailed visualization may be displayed. In some examples, the user may zoom out from the detailed visualization displayed at 1304 and return to the overview visualization displayed at 1300. These steps may be performed iteratively multiple times.

At 1306, the user may interact with the overview visualization and/or the detailed visualization. As described herein, interactions may include data filtering, display modification, selection, and zoom operation. For the overview visualization and/or the detailed visualization, the user may change visualization views, such as redefining the mapping between data dimensions and scatterplot axes, and/or perform data filtering, such as removing data points within a value range along one dimension.

At 1304, regions of interest may be identified, and at 1302, the data source may be accessed and data may be appropriately modified based on the identified regions of interest. Also, for example, at 1304, selected patterns may be identified and at 1308, analytics may be performed based on the selected patterns. In some examples, at 1308, deployment rules may be generated, and at 1302, data elements and/or interactions may be associated with the deployment rules. The steps described herein may be iteratively performed to detect data patterns and visually identify regions of interest.

Examples of the disclosure provide a generalized system for interactive analysis based on progressive visualizations. The generalized system provides a visually-guided interactive approach for visualizing a large volume of data at an interactive rate, allowing users to progressively configure the visualization, supporting the users to discover new patterns, and generating deployment rules based on these patterns.

Although specific examples have been illustrated and described herein, especially as related to high-dimensional security data, the examples illustrate applications to any dataset. Accordingly, there may be a variety of alternate and/or equivalent implementations that may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
    a data module that:
        receives information related to a display resolution that is to display a data visualization,
        aggregates sub-pluralities of data elements from a plurality of data elements wherein the sub-pluralities of data elements are representative of the plurality of data elements and the sub-pluralities of data elements are aggregated based at least on the display resolution wherein data resolution of the plurality of data elements exceeds the display resolution, and
        provides iteratively, the sub-pluralities of data elements for the data visualization;
    a visualization module that progressively displays the data visualization, the progressive display of the data visualization causes the visualization module to:
        generate a first data visualization including an overview visualization from at least one of the sub-pluralities of data elements;
        iteratively repeat the steps of:
            loading each of the sub-pluralities of data elements, and
            rendering the loaded sub-plurality of data elements within the overview visualization wherein the sub-plurality of data elements blends within the overview visualization displayed on an interactive graphical user interface;
        generate a detailed visualization based on an interaction with the overview visualization;
    an interaction module that processes the interaction with the overview visualization; and
    an analytics module that analyzes the interaction to generate a deployment rule.

2. The system of claim 1, wherein the visualization module is to further automatically predict a future visualization based on user interaction with a prior visualization.

3. The system of claim 1, wherein the analytics module is to further perform automated analytics based on the deployment rule.

4. The system of claim 1, wherein the data module is to associate the interaction with the deployment rule.

5. The system of claim 1, wherein the interaction module is to process the interaction while the data visualization is being displayed.

6. The system of claim 1, wherein the visualization module is to automatically add data elements of the plurality of data elements to the data visualization.

7. The system of claim 1, wherein the visualization module is to further generate a sequence of collections of data elements based on successive visualizations of the collections of data elements.

8. The system of claim 7, wherein the visualization module is to rank the sequence of collections of data elements based on domain relevance.

9. The system of claim 1, wherein the interaction includes selection of a portion of the overview visualization, the selection including at least one of bounding box, lasso, and pinpointing.

10. The system of claim 1, wherein the interaction includes one of data filtering and display modification.

11. The system of claim 10, wherein the data filtering includes a zoom operation performed on the data visualization.

12. The system of claim 1, wherein the data visualization is a three-dimensional scatterplot.

13. A method for interactive analysis based on progressive visualizations, the method comprising:
    receiving information related to a display resolution that is to display a data visualization;
    accessing a plurality of data elements from a database;
    aggregating sub-pluralities of data elements of the plurality of data elements wherein the sub-pluralities of data elements are representative of the plurality of data elements and the sub-pluralities of data elements are aggregated based at least on the display resolution wherein data resolution of the plurality of data elements exceeds the display resolution;
    progressively and iteratively displaying the data visualization wherein the progressive display of the data visualization includes:
        generating a first data visualization including an overview visualization of at least one of the sub-pluralities of data elements; and
        iteratively repeating the steps of:
            loading each of the sub-pluralities of data elements representative of the plurality of data elements, and
            rendering the loaded sub-plurality of data elements within the overview visualization where the sub-plurality of data elements blends within the overview visualization displayed via an interactive graphical user interface;
    iteratively processing an interaction with the overview visualization;
    displaying, a detailed visualization of the overview visualization, the detailed visualization being generated in response to the interaction with the overview visualization;
    analyzing the interaction to generate an additional deployment rule; and
    performing automated analytics based on the additional deployment rule.

14. A non-transitory computer readable medium comprising executable instructions that cause a processor to:
    receive information related to a display resolution that is to display a data visualization;
    aggregate sub-pluralities of data elements of a plurality of data elements so that the sub-pluralities of data elements are representative of the plurality of data elements and the sub-pluralities of data elements are aggregated based at least on the display resolution wherein data resolution of the plurality of data elements exceeds the display resolution;

provides iteratively, the sub-pluralities of data elements for a data visualization;

progressively display the data visualization wherein the progressive display of the data visualization includes:

generating a first data visualization including an overview visualization of at least one of the sub-pluralities of data elements; and iteratively repeating the steps of:

loading each of the sub-pluralities of data elements representative of the plurality of data elements, and rendering the loaded sub-plurality of data elements within the overview visualization such that the sub-plurality of data elements blends within the overview visualization displayed via an interactive graphical user interface;

process an interaction with the data visualization;

display, based on the interaction, a detailed visualization of the overview visualization;

analyze the interaction to generate an additional deployment rule; and associate the interaction with the additional deployment rule.

15. The method of claim 13, further comprising:

receiving information related to the display resolution associated with the interactive graphical user interface; and based on the aggregation, providing the sub-plurality of the plurality of data elements for display in the data visualization.

16. The method of claim 15, wherein aggregating the plurality of data elements further comprises:

aggregating, based on the display resolution, the plurality of data elements at a computing node close to a data repository storing the plurality of data elements.

17. The method of claim 15, further comprising:

generating a sequence of collections of the plurality of data elements based on successive visualizations of the collections of data elements.

18. The method of claim 17, further comprising:

ranking within the sequence, the collections of data elements based on domain relevance; and extracting as the sub-plurality, smaller portions of the collections of data elements for the progressive display of the data visualization.

19. The method of claim 17, wherein loading each of the sub-pluralities of data elements further comprising:

loading, for the rendering, the sub-plurality of data elements projected into a perceivable display space in a screen displaying the data visualization.

* * * * *